US010555069B2

(12) United States Patent
Iyer et al.

(10) Patent No.: US 10,555,069 B2
(45) **Date of Patent: *Feb. 4, 2020**

(54) APPROACH FOR DETECTING ALERT SIGNALS IN CHANGING ENVIRONMENTS

(71) Applicant: HARMAN INTERNATIONAL INDUSTRIES, INCORPORATED, Stamford, CT (US)

(72) Inventors: Ajay Iyer, Murray, UT (US); Jeffrey Hutchings, Lehi, UT (US); Richard Allen Kreifeldt, South Jordan, UT (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,937

(22) Filed: Aug. 14, 2017

(65) Prior Publication Data

US 2018/0014112 A1 Jan. 11, 2018

Related U.S. Application Data

(63) Continuation of application No. 15/093,587, filed on Apr. 7, 2016, now Pat. No. 9,749,733.

(51) Int. Cl.
*H04B 15/00* (2006.01)
*H04R 1/10* (2006.01)
(Continued)

(52) U.S. Cl.
CPC ........ *H04R 1/1083* (2013.01); *G10L 21/0232* (2013.01); *G10L 21/0264* (2013.01); *G10L 21/0388* (2013.01)

(58) Field of Classification Search
CPC ............. H04R 1/1083; G10L 21/0232; G10L 21/0264; G10L 21/0388
See application file for complete search history.

(56) References Cited

U.S. PATENT DOCUMENTS 4,410,763 A 10/1983 Strawczynski et al.
5,485,522 A 1/1996 Soelve et al.
(Continued)

OTHER PUBLICATIONS

Extended European Search Report for EP Application No. 17164747.2 dated Aug. 24, 2017, 7 pages.

*Primary Examiner* — Simon King
(74) *Attorney, Agent, or Firm* — Artegis Law Group, LLP

(57) ABSTRACT

In an audio system, an audio signal is preprocessed to provide an input signal to a fast detector and a slow detector, the input signal comprising alert signals and ambient sounds. The slow detector determines the ambient sound level of the input signal which is output to an alert signal detector. The alert signal detector uses the ambient sound level to compute an adaptive threshold level using an adaptive threshold function. The fast detector determines the envelope level of the input signal which is output to the alert signal detector. The alert signal detector compares the envelope level to the adaptive threshold level to determine if an alert signal is present in the input signal. The adaptive threshold level varies depending on the ambient sound level of the input signal and the alert signal detection of the audio system automatically adapts to changing acoustic environments having different ambient sound levels.

24 Claims, 3 Drawing Sheets

(51) Int. Cl.
*G10L 21/0232* (2013.01)
*G10L 21/0264* (2013.01)
*G10L 21/0388* (2013.01)

(56) References Cited

U.S. PATENT DOCUMENTS

| | | | | | |
|---|---|---|---|---|---|
| 6,941,161 | B1 * | 9/2005 | Bobisuthi | H04M 1/6008 | 379/142.13 |
| 7,561,700 | B1 | 7/2009 | Bernardi et al. | | |
| 2005/0108004 | A1 * | 5/2005 | Otani | G10L 15/1807 | 704/205 |
| 2007/0288232 | A1 * | 12/2007 | Kim | G10L 19/093 | 704/206 |
| 2008/0111714 | A1 * | 5/2008 | Kremin | G06F 3/044 | 341/33 |
| 2008/0240484 | A1 | 10/2008 | Tanghe et al. | | |
| 2010/0056198 | A1 | 3/2010 | Tachibana | | |
| 2010/0310086 | A1 * | 12/2010 | Magrath | G10K 11/178 | 381/71.11 |
| 2011/0026722 | A1 * | 2/2011 | Jing | G10L 21/0208 | 381/71.1 |
| 2011/0184734 | A1 | 7/2011 | Wang et al. | | |
| 2011/0286606 | A1 * | 11/2011 | Al-Naimi | G10K 11/178 | 381/71.1 |
| 2012/0059650 | A1 * | 3/2012 | Faure | G10L 25/69 | 704/226 |
| 2013/0024193 | A1 | 1/2013 | Yeldener et al. | | |
| 2013/0103398 | A1 * | 4/2013 | Rauhala | G10L 25/78 | 704/233 |
| 2014/0117947 | A1 * | 5/2014 | Lai | H03K 21/38 | 323/205 |
| 2014/0257821 | A1 * | 9/2014 | Adams | G10L 25/93 | 704/275 |
| 2014/0289630 | A1 * | 9/2014 | Duwenhorst | G11B 27/00 | 715/727 |
| 2015/0358730 | A1 * | 12/2015 | Kirsch | H04R 3/002 | 381/71.1 |
| 2017/0110142 | A1 * | 4/2017 | Fan | G10L 21/0216 | |
| 2017/0256270 | A1 * | 9/2017 | Singaraju | G10L 25/84 | |

* cited by examiner

APPROACH FOR DETECTING ALERT SIGNALS IN CHANGING ENVIRONMENTS

CROSS-REFERENCE TO RELATED APPLICATIONS

This application is a continuation of the co-pending U.S. patent application titled, "APPROACH FOR DETECTING ALERT SIGNALS IN CHANGING ENVIRONMENTS," filed on Apr. 7, 2016 and having Ser. No. 15/093,587. The subject matter of this application is hereby incorporated herein by reference.

BACKGROUND

Field of the Embodiments of the Present Disclosure

Embodiments of the present disclosure relate generally to audio signal processing and, more specifically, to an approach for detecting alert signals in changing environments.

Description of the Related Art

Headphones, earphones, earbuds, and other personal listening devices are commonly used by individuals who desire to listen to sounds generated from a particular type of audio source, such as music, speech, or movie soundtracks, without disturbing other people in the nearby vicinity. These types of sounds are referred to herein generally as "entertainment" signals, and each such entertainment signal is characterized herein as an audio signal that is present over a sustained period of time.

Typically, personal listening devices include an audio plug for insertion into an audio output of an audio playback device. The audio plug connects to a cable that carries the audio signal from the audio playback device to the personal listening device. In order to provide high quality audio, such personal listening devices usually include speaker components that cover the entire ear or completely seal the ear canal. The personal listening device is designed to provide a good acoustic seal, thereby reducing audio signal leakage and improving the quality of the listener experience, particularly with respect to bass responses.

One drawback of the above personal listening device design is that, because the devices form a good acoustic seal with the ear, the ability of the user to hear environmental sound is substantially reduced, which can present substantial safety issues for the user. For example, the user may be unable to hear certain important sounds from the environment, such as the sound of an oncoming vehicle, human speech, or an alarm. These types of important sounds emanating from the environment are referred to herein as "priority" or "alert" signals, and each such signal is typically characterized as an audio signal that is intermittent, acting as an interruption to the more sustained sounds generated by entertainment signals or other aspects of the listening environment.

One approach to solving above problem involves attempting to detect alert signals present in the listening environment using one or more microphones that are integrated within a listening device. Upon detecting an alert signal, the listening device can automatically reduce the sound level of an entertainment signal, for example, and playback the alert signal to the user to make the user aware of the alert signal. Traditional solutions for detecting alert signals, however, are computationally complex and require significant processing resources to obtain acceptable performance. Also, such solutions do not consider changing acoustic environments and thus do not provide satisfactory performance in different acoustic environments.

As the foregoing illustrates, more effective techniques for detecting alert signals within listening environments that can be implemented in personal listening devices would be useful.

SUMMARY

Various embodiments set forth an audio processing system that includes a slow detector configured to determine an ambient sound level of an audio input signal comprising environment sounds and transmit the ambient sound level to an alert signal detector. The audio processing system also includes a fast detector configured to determine an envelope level of the audio input signal and transmit the envelope level to the alert signal detector. The audio processing system further includes an alert signal detector configured to determine an adaptive threshold level based on the ambient sound level and determine if an alert signal is present in the audio input signal by comparing the envelope level to the adaptive threshold level.

Other embodiments include, without limitation, a computer readable medium including instructions for performing one or more aspects of the disclosed techniques, as well as a method for performing one or more aspects of the disclosed techniques.

At least one advantage of the disclosed approach is that it allows the audio processing system to be implemented in a simple and low-cost manner that detects alert signals in changing acoustic environments.

BRIEF DESCRIPTION OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

System Overview

Figure 1:
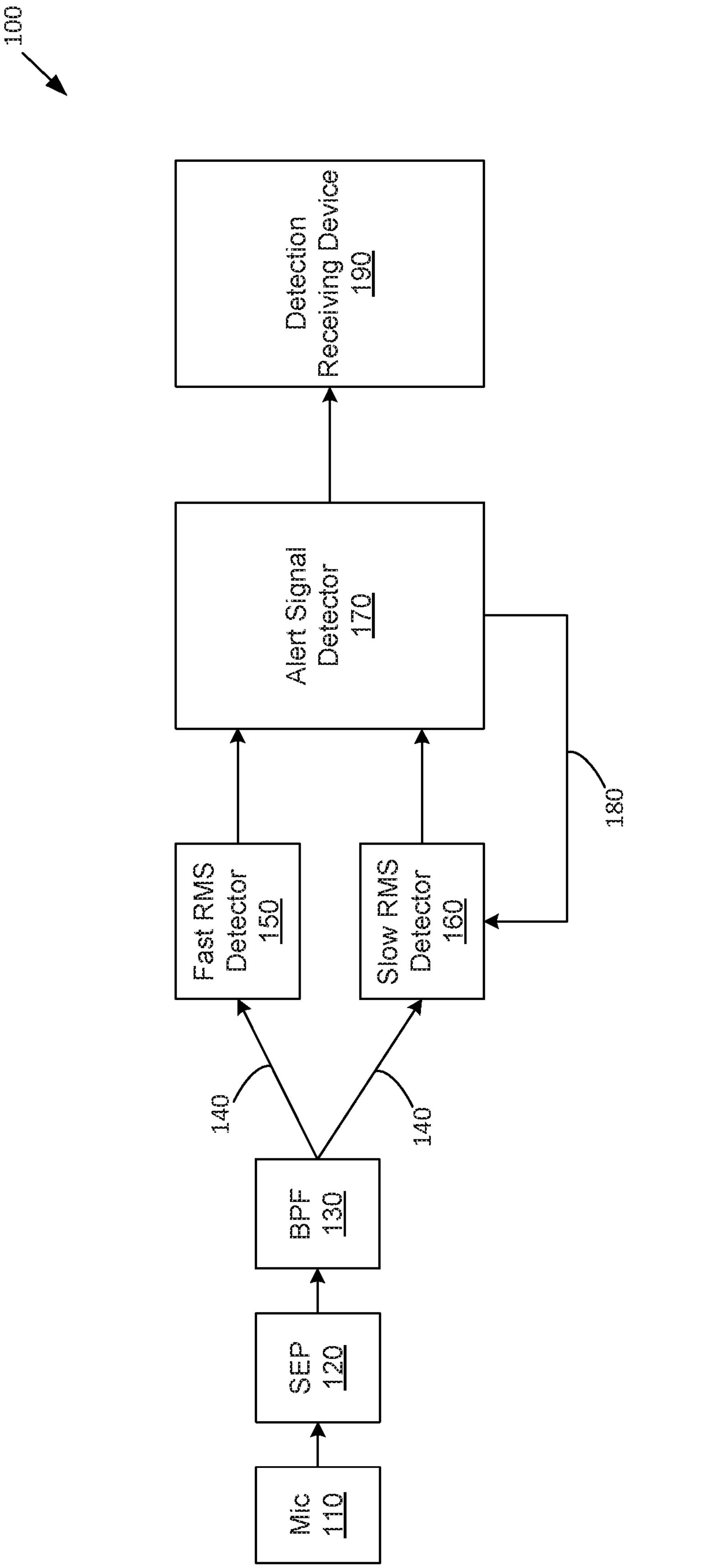
FIG. 1 illustrates an audio processing system configured to implement one or more aspects of the various embodiments.

FIG. 1 illustrates an audio processing system 100 configured to implement one or more aspects of the various embodiments. As shown, audio processing system 100 includes, without limitation, components such as microphone 110, sound environment processor (SEP) 120, bandpass filter (BPF) 130, fast root-mean square (RMS) detector 150, slow RMS detector 160, alert signal detector 170, and detection receiving device 190. Each component of the audio processing system 100 shown in FIG. 1 may be manufactured and implemented in software and/or hardware. For example, each component may be implemented in hardware using hardwired digital and/or analog circuits and/or implemented in software using a memory unit and processor unit. In general, a processor unit may be any technically feasible hardware unit capable of processing data and/or executing software applications. For example, a processor may comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU. A memory unit is configured to store software application(s) and data. Instructions from the software constructs within the memory unit are executed by processors to enable the inventive operations and functions described herein.

In general, the microphone 110 captures sound from the environment and sends the captured audio signal to the sound environment processor 120. The audio signal captures environment sounds that include both alert signals and ambient sounds. The sound environment processor 120 performs noise reduction on the audio signal and transmits the processed signal to the bandpass filter 130 which produces a bandpass filtered signal (input signal 140) that is transmitted to both the fast RMS detector 150 and the slow RMS detector 160. The input signal 140 received by the fast and slow RMS detectors 150 and 160 contains both alert signals and ambient sounds. The slow RMS detector 160 is configured to determine the ambient sound level of the input signal 140 which is output to the alert signal detector 170. The alert signal detector 170 uses the ambient sound level to compute an adaptive threshold level using an adaptive threshold function. The fast RMS detector 150 is configured to determine the envelope level of the input signal 140 which is output to the alert signal detector 170. The alert signal detector 170 compares the envelope level to the adaptive threshold level to determine if an alert signal is currently present in the input signal 140. The alert signal detector 170 sends a detection signal to the detection receiving device 190, the detection signal indicating whether or not an alert signal is detected by the alert signal detector 170. The detection receiving device 190 receives the detection signal and performs one or more operations based on the state of the detection signal.

As described above, the sound environment processor 120 and bandpass filter 130 preprocesses the captured audio signal to produce the input signal 140 that is received by the fast and slow RMS detectors 150 and 160. In other embodiments, different preprocessing steps or no preprocessing steps are performed on the captured audio signal to produce the input signal 140. Regardless of the preprocessing steps, the audio input signal 140 (received by the fast and slow RMS detectors 150 and 160) comprises environment sounds that include both alert signals and ambient sounds. As described above, the alert signal detector 170 determines the adaptive threshold based level on the ambient sound level of a input signal 140 (as detected by the slow RMS detector 160), and then determines whether an alert signal is present by comparing the envelope level of the input signal 140 (as detected by the fast RMS detector 150) to the adaptive threshold level. Since the adaptive threshold level varies depending on the ambient sound level of the input signal 140, the detection of an alert signal also varies depending on the ambient sound level. Thus, the alert signal detection functions of the audio processing system 100 automatically adapt to changing acoustic environments having different ambient sound levels, without end-user input or intervention. By changing the adaptive threshold level depending on the ambient sound level, the detection of alert signals is more accurate and results in fewer false detections across different acoustic environments. Use of fast and slow RMS detectors 150 and 160 also provide a low-complexity solution while also providing good performance results.

As shown in FIG. 1, sound environment processor 120 receives an input audio signal from one or more microphones 110 that capture sound emanating from the environment. In some embodiments, sound environment processor 120 receives sound emanating from the environment electronically rather than via one or more microphones 110. Sound environment processor 120 performs noise reduction on the input audio signal. Sound environment processor 120 cleans and enhances the input audio signal by removing one or more noise signals, including, without limitation, microphone (mic) hiss, steady-state noise, very low frequency sounds (such as traffic din), and other low-level, steady-state sounds, while leaving intact any potential alert signal. In general, a low-level sound is a sound with a signal level that is below a threshold of loudness. In some embodiments, a gate may be used to remove such low-level signals from the input signal before transmitting the processed signal as an output to the bandpass filter 130.

In general, a steady-state sound is a sound where the spectrum of the signal remains relatively constant/slowly varies over time, in contrast to a transient sound with a spectrum that changes rapidly over time, such as an alert signal. In one example, and without limitation, the sound of an idling car could be considered a steady-state sound while the sound of an accelerating car or a car with a revving engine would not be considered a steady-state sound. In another example, and without limitation, the sound of operatic singing could be considered a steady-state sound while the sound of speech would not be considered a steady-state sound. In yet another example, and without limitation, the sound of very slow, symphonic music could be considered a steady-state sound while the sound of relatively faster, percussive music would not be considered a steady-state sound. A potential alert signal includes sounds that are not low-level, steady-state sound, such as human speech or an automobile horn.

Sound environment processor 120 outputs a noise-reduced signal to the bandpass filter 130. The bandpass filter 130 is applied to the noise-reduced signal to generate a bandpass filtered signal. The bandpass filter 130 only passes frequencies within a predetermined frequency range to further extract signal content and focus on a particular frequency range of interest that contains alert signals. In some embodiments, the bandpass filter 130 passes frequencies between a frequency range of 500-1800 Hz. In other embodiments, the bandpass filter 130 passes frequencies between a different frequency range. In some embodiments, the bandpass filter 130 operates in the time domain, thus saving the cost of transforming the signal into the frequency domain.

The bandpass filter 130 outputs the same bandpass filtered signal (audio input signal 140) to both the fast RMS detector 150 and the slow RMS detector 160. In general, an audio input signal 140 received by the fast and slow RMS detectors 150 and 160 contains environment sounds that include both alert signals and ambient sounds. The fast and slow RMS detectors 150 and 160 may comprise time domain detectors (that measure sound energy of a input signal 140 over a specified time period) for detecting these two different types of sound. The fast and slow RMS detectors 150 and 160 may do so by detecting the average RMS level of the audio energy in the input signal 140 over time periods of different length. In other embodiments, the fast and slow detectors 150 and 160 may employ an alternative signal level measurement technique other than detecting the RMS level of the signal. In one example, and without limitation, fast and slow detectors 150 and 160 employ a more sophisticated psychoacoustic signal level measurement technique. In further embodiments, different types of detectors may be used, such as peak detectors, envelope detectors, energy detectors, or frequency domain detectors.

The slow RMS detector 160 may be configured to detect and output the average energy level in the input signal 140 over a relatively longer time period (compared to the fast RMS detector 150). The average energy level over the relatively longer time period in the input signal 140 may be referred to herein as the ambient sound level. Ambient sound comprises a steady-state sound with a relatively lower signal amplitude that remains relatively constant over time (compared to alert signals), such as traffic noise, pedestrian noise, and other background noise. The ambient sound level is used to compute the adaptive threshold by applying an adaptive threshold function, as discussed below in relation to FIG. 2.

The fast RMS detector 150 may be configured to detect and output the average energy in the input signal 140 over a relatively shorter time period (compared to the slow RMS detector 160). The average energy over the relatively shorter time period in the input signal 140 may be referred to herein as the envelope level of the input signal 140. The fast RMS detector 150 is used to help determine if the input signal 140 currently includes an alert signal. An alert signal comprises a relatively fast/brief transient sound with a relatively higher signal amplitude that changes rapidly over time (compared to ambient sounds), such as a person yelling or a car honking. Thus, an alert signal may be characterized by a high sound energy spike over a short time period. An alert signal is detected based on the envelope level of the input signal 140 (as output by the fast RMS detector 150) and the adaptive threshold. For example, if the envelope level output from the fast RMS detector 150 exceeds the adaptive threshold, an alert signal may be determined to be currently present in the input signal 140.

In some embodiments, the outputs of the fast RMS detector 150 and the slow RMS detector 160 are each represented by the below equation:

$$v[n]=a*u[n]+(1-a)*v[n-1] \tag{1}$$

In equation (1):

v[n]=current output value of the RMS detector;

a=time coefficient of the detector;

u[n]=input signal 140; and v[n−1]=previous output value of the RMS detector.

The output value of each RMS detector 150 and 160 may be sampled at a predetermined sampling frequency. Thus, v[n] may equal the current output value of the detector for a current sample point and v[n−1] may equal a previous output value of the RMS detector for a previous sample point. As shown, the current output value v[n] of the RMS detector is based on the previous output value v[n−1] of the RMS detector, the time coefficient "a" of the detector, and the received input signal u[n]. Thus, each RMS detector 150 and 160 may contain a memory component (not shown) for storing previous output values and a processor component (not shown) for calculating the current output value using the previous output value, time coefficient "a", and the received input signal. In some embodiments, the received input signal u[n] equals the bandpass filtered signal received from the bandpass filter 130. In other embodiments, the received input signal u[n] equals the bandpass filtered signal that is then rectified and transformed into the log domain by the RMS detector (as discussed below).

In some embodiments, v[n] equals the average energy level of the received input signal u[n] over a time period that is defined by the time coefficient "a" of the detector. In these embodiments, the fast RMS detector 150 and the slow RMS detector 160 are differentiated by different values for the time coefficient "a". The output v[n] of the fast RMS detector 150 may equal the average energy level of the received input signal u[n] over a first time period, and the output v[n] of the slow RMS detector 160 may equal the average energy level of the received input signal u[n] over a second time period, the first time period being shorter than the second time period. For example, the first time period for the fast RMS detector 150 may be approximately equal to 22 ms and the second time period for the slow RMS detector 160 may be approximately equal to 128 ms. In this example, at each sample point, the fast RMS detector 150 may output the average energy level of the received input signal u[n] over the last 22 ms and the slow RMS detector 160 may output the average energy level of the received input signal u[n] over the last 128 ms. In other embodiments, other values for the first and second time periods are used.

In alternative embodiments, the fast and slow RMS detectors 150 and 160 each comprise a log domain RMS detector. In these embodiments, the received input signal u[n] (comprising the bandpass filtered signal) is rectified and transformed into the log (dB units) domain by the RMS detector. In these embodiments, the outputs of the fast RMS detector 150 and the slow RMS detector 160 are each represented by the below equation:

$$v[n]=a*\log(\text{abs}(u[n]))+(1-a)*v[n-1] \tag{2}$$

For example, in accordance with equation (2), at each sample point, the fast RMS detector 150 may output the average energy level (in the log-domain) of the received input signal u[n] over a 22 ms time period and the slow RMS detector 160 may output the average energy level (in the log-domain) of the received input signal u[n] over a 128 ms time period. The advantage of implementing the fast and slow RMS detectors 150 and 160 as log domain RMS detectors is that the output values of the fast and slow RMS detectors 150 and 160 are in terms of values in the log domain (e.g., dB FS). Thus, any subsequent multiplication and/or division operations involving the output values of the fast and slow RMS detectors 150 and 160 are replaced by simple addition and/or subtraction operations using log-values (e.g., to calculate the adaptive threshold as discussed below). Furthermore, the log domain values can be converted to dB values multiplying them by a factor of $$\frac{20}{\log(10)} \approx 8.7.$$

As shown in FIG. 1, the fast RMS detector 150 and slow RMS detector 160 each send an output to the alert signal detector 170. As discussed above, the output of the slow RMS detector 160 comprises the ambient sound level of the input signal 140 which is received by the alert signal detector 170. The alert signal detector 170 then uses the ambient sound level to compute an adaptive threshold by applying an adaptive threshold function. The adaptive threshold specifies a sound energy level that varies depending on the ambient sound level. The output of the fast RMS detector 150 comprises the envelope level of the input signal 140 which is also received by the alert signal detector 170. The alert signal detector 170 then uses the envelope level to determine if the received input signal currently contains an alert signal by comparing the envelope level to the adaptive threshold. For example, if the envelope level output from the fast RMS detector 150 is equal to or greater than the adaptive threshold level, an alert signal may be determined to be currently present in the received input signal. Otherwise, it may be determined that an alert signal is not currently present in the received input signal.

Thus, the alert signal detector 170 determines the adaptive threshold based on the ambient sound level of a received input signal, and then determines whether an alert signal is present in the received input signal by comparing the envelope level of the received input signal to the adaptive threshold. Since the adaptive threshold specifies a sound energy level that varies depending on the ambient sound level of the received input signal, the detection of alert signals in the received input signal also varies depending on the ambient sound level. Thus, the alert signal detection functions of the audio processing system 100 automatically adapt to changing acoustic environments, whereby the adaptive threshold for detecting the alert signals automatically changes when the ambient sound level of the environment changes, without end-user input or intervention. In some embodiments, as the ambient sound level increases, the adaptive threshold automatically increases and as the ambient sound level decreases, the adaptive threshold automatically decreases (as discussed below in relation to FIG. 2).

In some embodiments, the alert signal detector 170 also provides a conditional ambient update feature. In these embodiments, the ambient sound level (that is output from the slow RMS detector 160) is updated based on whether or not an alert signal is detected by the alert signal detector 170. As used here, a “current” ambient sound level comprises the ambient sound level at a “current” sampling point that is received and used by the alert signal detector 170 to detect an alert signal. If an alert signal is not detected, the current ambient sound level is updated at the next sampling point to generate a next ambient sound level (per usual operations of the audio processing system 100). However, if an alert signal is detected, the current ambient sound level is not updated at the next sampling point, but rather the current ambient sound level is still used by the alert signal detector 170 to detect alert signals. The current ambient sound level is continuously looped and used by the alert signal detector 170 at subsequent sampling points to detect alert signals until the alert signal detector 170 determines that the alert signal is no longer present in the input signal 140. After the alert signal detector 170 determines that the alert signal is no longer present in the input signal 140, the current ambient sound level is then updated at the next sampling point to generate a next ambient sound level (per usual operations of the audio processing system 100). This ensures that the relatively high energy level of an alert signal does not artificially elevate the ambient sound level at subsequent sampling points, which in turn would artificially elevate the adaptive threshold. By looping the current ambient sound level, a more realistic ambient sound level is input to the alert signal detector 170.

As shown in FIG. 1, to implement the conditional ambient update feature, the alert signal detector 170 sends a control signal 180 to the slow RMS detector 160. The state of the control signal 180 is based on whether or not an alert signal has been detected. If an alert signal is not detected by the alert signal detector 170, the alert signal detector 170 sends a control signal 180 to the slow RMS detector 160 to cause the slow RMS detector 160 to operate normally and update the ambient sound level at the next sampling point. If an alert signal is detected by the alert signal detector 170, the alert signal detector 170 sends a control signal 180 to the slow RMS detector 160 to cause the slow RMS detector 160 to not update the ambient sound level at the next sampling point and to continually output/loop the current ambient sound level. After the alert signal detector 170 determines that an alert signal is no longer present in the input signal 140, the alert signal detector 170 sends a control signal 180 to the slow RMS detector 160 to cause the slow RMS detector 160 to operate normally and update the ambient sound level at the next sampling point.

The alert signal detector 170 also sends a detection signal to the detection receiving device 190, the detection signal indicating whether or not an alert signal is detected by the alert signal detector 170. The detection receiving device 190 comprises a device that makes use of alert signal detection capabilities of the audio processing system 100. The detection receiving device 190 receives the detection signal and performs further operations based on the state of the detection signal. For example, the detection receiving device 190 may comprise a listening device that reduces the sound level of an entertainment signal and/or playback the alert signal through the listening device if the detection signal indicates that an alert signal is detected. As another example, the detection receiving device 190 may change settings for algorithms based on the state of the detection signal, such as modifying environment/sound specific audio processing settings. For instance, when the detection signal indicates an alert signal is detected, noise reduction settings may be modified to increase intelligibility of the input signal. In other embodiments, the detection receiving device 190 uses the detection signal for different purposes and performs different operations based on the state of the detection signal.

Adaptive Threshold Function

As discussed above, the adaptive threshold specifies a sound energy level that varies depending on the ambient sound level of the input signal 140. The adaptive threshold is a function of the ambient sound level (detected by the slow RMS detector 160), whereby the adaptive threshold automatically changes when the ambient sound level of the environment changes. An adaptive threshold function may represent the adaptive threshold as a transfer function of the ambience level. In some embodiments, the adaptive threshold function comprises a linear function, piecewise linear function, or a curve function. In other embodiments, the adaptive threshold function comprises any other type of transfer function that is dependent on the ambience level of the input signal 140.

In some embodiments, the adaptive threshold function comprises a piecewise linear function represented by the below equation:

$$y[n]=A1*x[n]+B \text{ if } x[n]<b$$

$$y[n]=A2*x[n]+C \text{ if } b\leq x[n] \quad (3)$$

The adaptive threshold function may also be represented in a different form by the below equation:

$$y[n]=\max(A*x[n]+B,x[n]+C) \quad (4)$$

In equations (3) and (4):

y[n]=adaptive threshold level;

x[n]=ambient sound level (output of the slow RMS detector 160);

A1*x[n]+B=first threshold function;

A2*x[n]+C=second threshold function;

x[n]<b=first range of ambient sound levels;

b≤x[n]=second range of ambient sound levels; and b=transition sound level.

Figure 2:
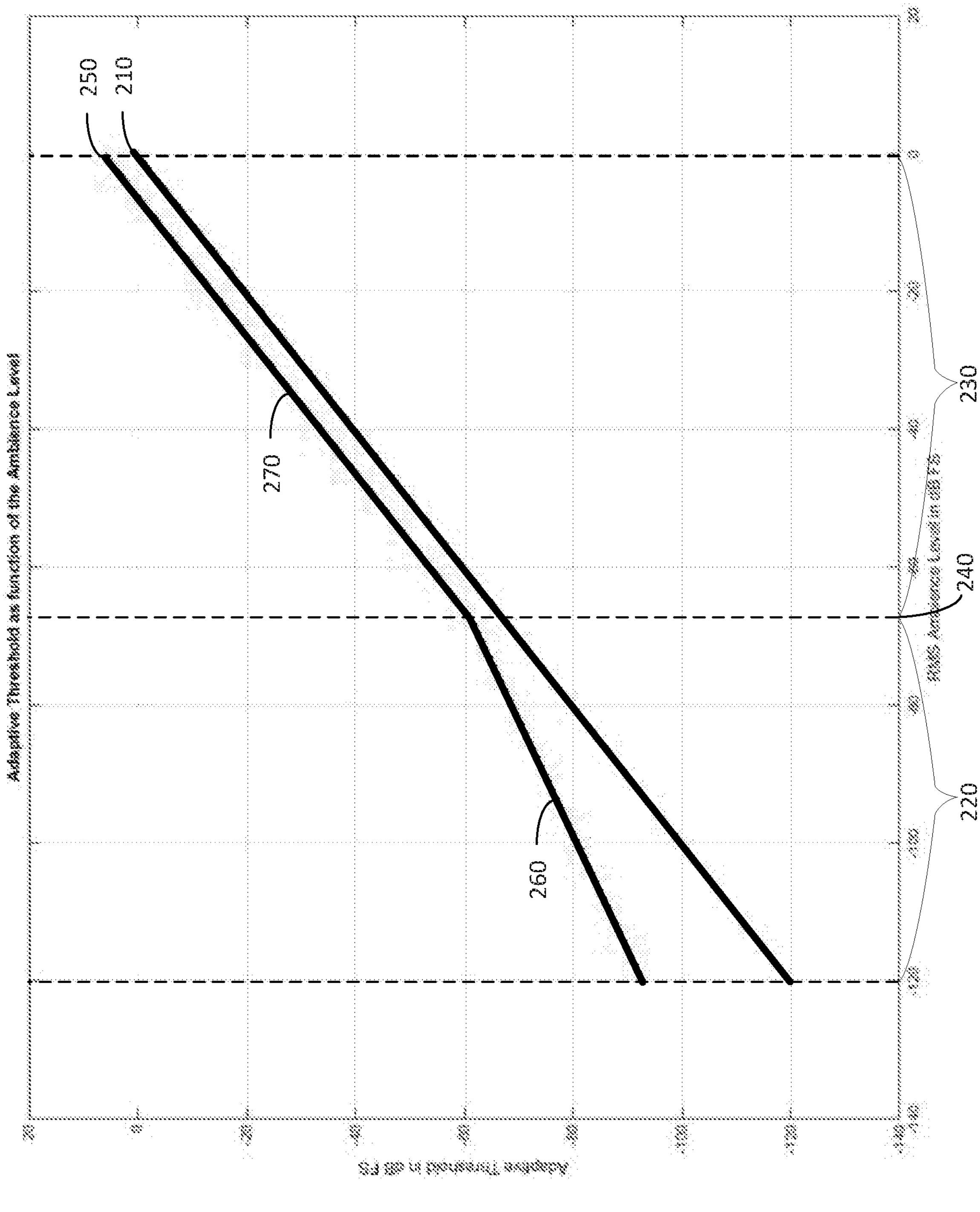
FIG. 2 illustrates an exemplary adaptive threshold function implemented by the alert signal detector of FIG. 1, according to various embodiments.

FIG. 2 illustrates an exemplary adaptive threshold function implemented by the alert signal detector of FIG. 1, according to various embodiments. The x-axis represents the ambient sound level (in dB FS) and the y-axis represents the adaptive threshold level (in dB FS). The adaptive threshold function shown in FIG. 2 is represented by equation (3). An ambient line graph 210 represents the ambient sound level x[n] (in dB FS). The ambient line graph 210 is divided into a first range of ambient sound levels 220 (that is lower than a transition sound level 240) and a second range of ambient sound levels 230 (that is higher than the transition sound level 240). A threshold line graph 250 represents the adaptive threshold sound level y[n] (in dB FS). The threshold line graph 250 is divided into a first threshold line 260 that is a function of the first range of ambient sound levels 220 (below the transition sound level 240) and a second threshold line 270 that is a function of the second range of ambient sound levels 230 (above the transition sound level 240).

The first threshold line 260 is determined by a first threshold function (A1*x[n]+B) defined for the first range of ambient sound levels 220 and the second threshold line 270 is determined by a second threshold function (A2*x[n]+C) defined for the second range of ambient sound levels 230. By designing different adaptive threshold functions for different ranges of ambient sound levels (defined by the transition sound level 240), the adaptive threshold function itself may vary based on the range of ambient sound levels. In this manner, an adaptive threshold function may be specifically designed for a particular range of ambient sound levels to produce the best performance results. For example, a first threshold function may be defined that works better in "low" ambient sound levels and a second threshold function may be defined that works better in "high" ambient sound levels. In further embodiments, different adaptive threshold functions may be defined for two or more different ranges of ambient sound levels (such as low, medium, and high ambient sound levels). The transition sound level 240 that defines and separates the first and second ranges of ambient sound levels may be determined experimentally to produce the best performance results. In some embodiments, the transition sound level 240 is approximately equal to −65 dB FS ambient sound level.

In the example of FIG. 2, the first and second threshold functions are linear functions having different slope coefficients "A1" and "A2". In other embodiments, the first threshold function and/or the second threshold function may comprise a non-linear function. For the first threshold function, "A1" is the slope coefficient for the first threshold line 260 and "B" is the point where the first threshold line 260 would intersect the y-axis (at 0 dB FS ambient sound level) if extended to the y-axis. For the second threshold function, "A2" is the slope coefficient for the second threshold line 270 and "C" is the point where the second threshold line 270 intersects the y-axis (at 0 dB FS ambient sound level). The slope coefficients A1 and A2 controls the steepness with which the adaptive threshold increases or decreases as a function of change in the ambient sound level. The value for B determines the ambient sound level (e.g., −65 dB FS) at which the change in steepness begins. The value for C determines a scaling factor of the ambient sound level to compute the adaptive threshold.

The values for A1 and B may be determined experimentally to provide the best performance results for the first range of ambient sound levels 220 and the values for A2 and C may be determined experimentally to provide the best performance results for the second range of ambient sound levels 230. For example, experimentally it has been found that scaling the ambient sound level by a constant scaling factor to determine the adaptive threshold level works well for the higher range of ambient sound levels 230. Therefore, the slope A2 of the second threshold line 270 for the higher range of ambient sound levels 230 may be set to equal 1, which produces an adaptive threshold level that equals the ambient sound level times a constant scaling factor. Experimentally it has been also been found that an adaptive threshold level that equals the ambient sound level times a constant scaling factor of approximately 1.5 works well for the higher range of ambient sound levels 230. In the second threshold line 270, the value for C determines the resulting constant scaling factor. Therefore, the value for C in the second threshold line 270 may be used that produces a constant scaling factor of approximately 1.5 for the higher range of ambient sound levels 230.

However, experimentally it has been found that using an adaptive threshold level that equals the ambient sound level times a constant scaling factor does not work well for the lower range of ambient sound levels 220. This is due to the fact that the average energy of the ambient level is so low that many types of sounds (e.g., walking, dropping keys) that are not alert signals may be incorrectly detected as alert signals if a constant scaling factor is used. Thus, at lower ambient sound levels, a non-constant/variable scaling factor that increases as the ambient sound level decreases may be used. Thus, the slope A1 of the first threshold line 260 for the lower range of ambient sound levels 230 may be set to equal less than 1, which produces a variable scaling factor that that increases as the ambient sound level decreases. The variable scaling factor is applied to the ambient sound level to determine the adaptive threshold level.

Detecting Alert Signals in an Audio Signal

Figure 3:
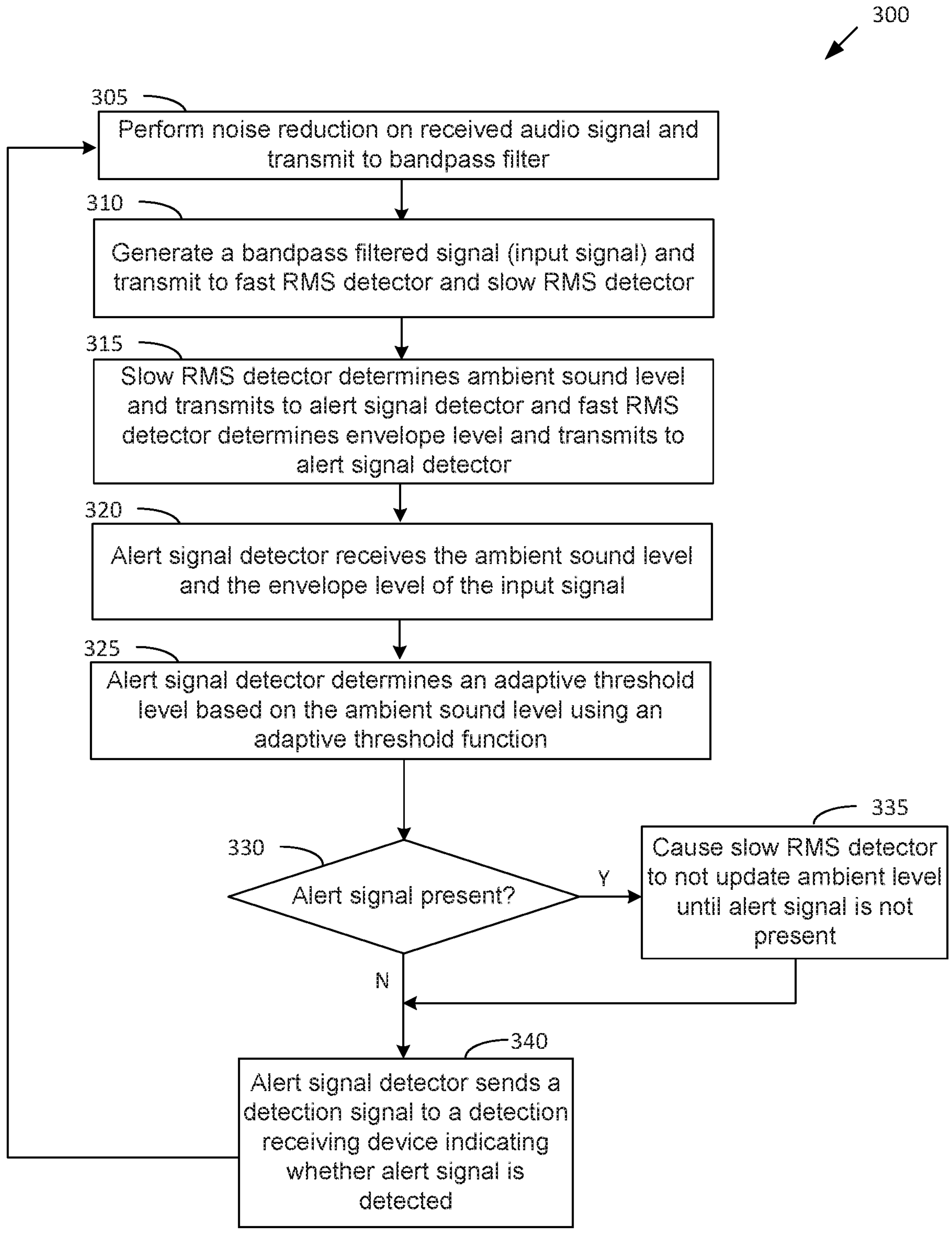
FIG. 3 is a flow diagram of method steps for detecting an alert signal within an audio signal, according to various embodiments.

FIG. 3 is a flow diagram of method steps for detecting an alert signal within an audio signal, according to various embodiments. Although the method steps are described in conjunction with the systems of FIGS. 1-2, persons skilled in the art will understand that any system configured to perform the method steps, in any order, is within the scope of the present disclosure.

As shown, a method 300 begins at step 305, where sound environment processor 120 receives environmental sound via an audio signal. The audio signal captures environment sounds that include both alert signals and ambient sounds. The sound environment processor 120 performs noise reduction on the audio signal and transmits the processed signal to a bandpass filter 130. At step 310, the bandpass filter 130 receives the processed signal, applies a bandpass filter to generate a bandpass filtered signal, and transmits the bandpass filtered signal (audio input signal 140) to both the fast RMS detector 150 and the slow RMS detector 160. The input signal 140 contains both alert signals and ambient sounds.

At step 315, the fast and slow RMS detectors 150 and 160 each receive the input signal 140. The fast and slow RMS detectors 150 and 160 may comprise time domain detectors that measure the average RMS level of the audio energy in the input signal 140 over time periods of different length, the time period for the fast RMS detector 150 (e.g., 22 ms) being shorter than the time period for the slow RMS detector 160 (e.g., 128 ms). In some embodiments, the fast and slow RMS detectors 150 and 160 each comprise a log domain RMS detector that first rectifies and transforms the received input signal 140 into the log (dB units) domain. The slow RMS detector 160 determines the ambient sound level of the input signal 140 and transmits the ambient sound level to the alert signal detector 170. The fast RMS detector 150 determines the envelope level of the input signal 140 and transmits the envelope level to the alert signal detector 170.

At step 320, the alert signal detector 170 receives the ambient sound level and the envelope level of the input signal 140. At step 325, the alert signal detector 170 applies an adaptive threshold function to determine an adaptive threshold level based on the ambient sound level. For example, the adaptive threshold function may comprise a linear function, piecewise linear function, or a curve function.

At step 330, the alert signal detector 170 determines if an alert signal is present in the input signal 140. The alert signal detector 170 may do so by comparing the received envelope level of the input signal 140 and the adaptive threshold level. For example, if the envelope level is equal to or greater than the adaptive threshold level, the alert signal detector 170 determines that an alert signal is present in the input signal 140. Otherwise, the alert signal detector 170 determines that an alert signal is not currently present in the received input signal 140.

If the alert signal detector 170 determines (at step 330—No) that an alert signal is not present, the method 300 continues at step 340. If the alert signal detector 170 determines (at step 330—Yes) that an alert signal is present, the alert signal detector 170 sends (at step 335) a control signal 180 to the slow RMS detector 160 to cause the slow RMS detector 160 to not update the ambient sound level at the next sampling point and to continually output/loop the current ambient sound level until the alert signal detector 170 determines that an alert signal is no longer present in the input signal 140. The method 300 then continues at step 340.

At step 340, the alert signal detector 170 sends a detection signal to a detection receiving device 190, the detection signal indicating whether or not an alert signal is detected by the alert signal detector 170. The detection receiving device 190 receives the detection signal and performs further operations based on the state of the detection signal. The method 300 then proceeds to step 305, described above. In various embodiments, the steps of method 300 may be performed in a continuous loop until certain events occur, such as powering down a device that includes the audio processing system 100.

In sum, in an audio processing system 100, a captured audio signal is processed by a sound environment processor and bandpass filter to provide an audio input signal 140 to a fast RMS detector 150 and a slow RMS detector 160, the input signal 140 containing both alert signals and ambient sounds. The slow RMS detector 160 determines the ambient sound level of the input signal 140 which is output to the alert signal detector 170. The alert signal detector 170 uses the ambient sound level to compute an adaptive threshold level using an adaptive threshold function. The fast RMS detector 150 determines the envelope level of the input signal 140 which is output to the alert signal detector 170. The alert signal detector 170 compares the envelope level to the adaptive threshold level to determine if an alert signal is currently present in the input signal 140. Since the adaptive threshold level varies depending on the ambient sound level of the input signal 140, the detection of an alert signal also varies depending on the ambient sound level. Thus, the alert signal detection functions of the audio processing system 100 automatically adapt to changing acoustic environments having different ambient sound levels, without end-user input or intervention.

At least one advantage of the approach described herein is that the audio processing system can be implemented in a simple and low-cost manner while also detecting alert signals in changing acoustic environments. Another advantage of the approach described herein the adaptive threshold level (for detecting an alert signal) changes automatically based on the ambient sound level of the environment, whereby accurate detection of alert signals is enabled across different acoustic environments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "component," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
- determining a first energy level of an audio input signal;
- computing, via a processor, a threshold level based on the first energy level and a threshold function;
- determining a second energy level of the audio input signal; and
- comparing the second energy level to the threshold level to determine whether an alert signal is present in the audio input signal.

2. The method of claim 1, wherein computing the threshold level comprises applying an adaptive threshold function to the first energy level of the audio input signal.

3. The method of claim 2, wherein the adaptive threshold function comprises a linear function, a piecewise linear function, or a curve function.

4. The method of claim 1, wherein the first energy level indicates an ambient sound level associated with the audio input signal, and the second energy level indicates whether the audio input signal includes an alert signal.

5. The method of claim 4, wherein computing the threshold level comprises applying a first adaptive threshold function to the ambient sound level when the ambient sound level falls within a first range of ambient sound levels, and applying a second adaptive threshold function to the ambient sound level when the ambient sound level falls within a second range of ambient sound levels.

6. The method of claim 5, wherein:
- the first range of ambient sound levels is lower than the second range of ambient sound levels;
- the first adaptive threshold function comprises a linear function having a first slope; and
- the second adaptive threshold function comprises a linear function having a second slope that is greater than the first slope.

7. The method of claim 6, wherein the first slope is less than 1 and the second slope is equal to 1.

8. The method of claim 5, wherein:
- the first range of ambient sound levels is lower than the second range of ambient sound levels;
- when the ambient sound level falls within the first range of ambient sound levels, the threshold level equals the product of the ambient sound level and a non-constant scaling factor; and
- when the ambient sound level falls within the second range of ambient sound levels, the threshold level equals the product of the ambient sound level and a constant scaling factor.

9. The method of claim 4, further comprising not updating the ambient sound level of the audio input signal when an alert signal is present in the audio input signal.

10. The method of claim 1, wherein the first energy level of the audio input signal comprises a first average energy level of the audio input signal over a first time period, and the second energy level of the audio input signal comprises a second average energy level of the audio input signal over a second time period that is less than the first time period.

11. One or more non-transitory computer-readable media including instructions that, when executed by one or more processors, configure the one or more processors to perform the steps of:
- receiving an ambient sound level associated with an audio input signal;
- computing a threshold level based on the ambient sound level and a threshold function;
- receiving an envelope level associated with the audio input signal; and
- comparing the envelope level to the threshold level to determine whether an alert signal is present in the audio input signal.

12. The one or more non-transitory computer-readable media of claim 11, wherein the ambient sound level is associated with a first energy level of the audio input signal over a first time period, and the envelope is associated with a second energy level of the audio input signal over second time period that is shorter than the first time period.

13. The one or more non-transitory computer-readable media of claim 12, wherein the first energy level of the audio input signal over the first time period comprises a first average energy level of the audio input signal over the first time period, and the second energy level of the audio input signal over the second period of time comprises a second average energy level of the audio input signal over the second time period.

14. The one or more non-transitory computer-readable media of claim 11, wherein computing the threshold level comprises applying an adaptive threshold function to the ambient sound level associated with the audio input signal.

15. The one or more non-transitory computer-readable media of claim 14, wherein the adaptive threshold function comprises a linear function, a piecewise linear function, or a curve function.

16. The one or more non-transitory computer-readable media of claim 11, wherein computing the threshold level comprises applying a first adaptive threshold function to the ambient sound level associated with the audio input signal when the ambient sound level falls within a first range of ambient sound levels, and applying a second adaptive threshold function to the ambient sound level associated with the audio input signal when the ambient sound level falls within a second range of ambient sound levels.

17. The one or more non-transitory computer-readable media of claim 16, wherein:

the first range of ambient sound levels is lower than the second range of ambient sound levels;

the first adaptive threshold function comprises a linear function having a first slope; and the second adaptive threshold function comprises a linear function having a second slope that is greater than the first slope.

18. The one or more non-transitory computer-readable media of claim 17, wherein the first slope is less than 1 and the second slope is equal to 1.

19. The one or more non-transitory computer-readable media of claim 16, wherein:

the first range of ambient sound levels is lower than the second range of ambient sound levels;

when the ambient sound level falls within the first range of ambient sound levels, the threshold level equals the product of the ambient sound level and a non-constant scaling factor; and when the ambient sound level falls within the second range of ambient sound levels, the threshold level equals the product of the ambient sound level and a constant scaling factor.

20. An audio processing system, comprising:

a first detector that determines an ambient sound level associated with an audio input signal;

a second detector that determines an envelope level associated with the audio input signal; and an alert signal detector that computes a threshold level based on the ambient sound level and a threshold function, and compares the envelope level to the threshold level to determine whether an alert signal is present in the audio input signal.

21. The audio processing system of claim 20, wherein each of the first detector and the second detector comprises a root-mean square (RMS) detector.

22. The audio processing system of claim 20, further comprising:

a sound environment processor that receives an audio signal from a microphone and performs one or more noise reduction operations on the audio signal to produce a processed signal; and a bandpass filter that attenuates a portion of the processed signal to produce the audio input signal that is then transmitted to the first detector and the second detector.

23. The audio processing system of claim 20, wherein the alert signal detector transmits a detection signal to a detection receiving device indicating whether an alert signal has been detected.

24. The audio processing system of claim 20, wherein the alert signal detector causes the first detector to refrain from updating the ambient sound level associated with the audio input signal when the alert signal is present in the audio input signal.

* * * * *